US012020075B2

(12) United States Patent
Havlir et al.

(10) Patent No.: US 12,020,075 B2
(45) Date of Patent: Jun. 25, 2024

(54) COMPUTE KERNEL PARSING WITH LIMITS IN ONE OR MORE DIMENSIONS WITH ITERATING THROUGH WORKGROUPS IN THE ONE OR MORE DIMENSIONS FOR EXECUTION

(71) Applicant: Apple Inc., Cupertino, CA (US)

(72) Inventors: Andrew M. Havlir, Orlando, FL (US); Ajay Simha Modugala, Orlando, FL (US); Karl D. Mann, Geneva, FL (US)

(73) Assignee: Apple Inc., Cupertino, CA (US)

(*) Notice: Subject to any disclaimer, the term of this patent is extended or adjusted under 35 U.S.C. 154(b) by 958 days.

(21) Appl. No.: 17/018,913

(22) Filed: Sep. 11, 2020

(65) Prior Publication Data
US 2022/0083377 A1    Mar. 17, 2022

(51) Int. Cl.
*G06F 9/50*     (2006.01)
*G06T 1/20*     (2006.01)

(52) U.S. Cl.
CPC .............. *G06F 9/505* (2013.01); *G06T 1/20* (2013.01)

(58) Field of Classification Search
None
See application file for complete search history.

(56) References Cited

U.S. PATENT DOCUMENTS

| | | |
|---|---|---|
| 7,834,881 B2 | 11/2010 | Liu et al. |
| 8,044,951 B1 | 10/2011 | Brown et al. |
| 8,056,080 B2 | 11/2011 | Alexander et al. |
| 8,516,461 B2 | 8/2013 | Bellows et al. |
| 8,760,455 B2 | 6/2014 | Duluk, Jr. et al. |
| 9,772,864 B2 | 9/2017 | Nystad |
| 10,593,094 B1 | 3/2020 | Havlir et al. |
| 2007/0091101 A1 | 8/2007 | Huang et al. |

(Continued)

OTHER PUBLICATIONS

Velazquez-Armendariz et al., "Automatic Bounding of Programmable Shaders for Efficient Global Illumination," ACM SIGGRAPH Asia 2009, 9 pages.

(Continued)

*Primary Examiner* — Meng Ai T An
*Assistant Examiner* — Zujia Xu
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to dispatching compute work from a compute stream. In some embodiments, a graphics processor executes instructions of compute kernels. Workload parser circuitry may determine, for distribution to the graphics processor circuitry, a set of workgroups from a compute kernel that includes workgroups organized in multiple dimensions, including a first number of workgroups in a first dimension and a second number of workgroups in a second dimension. This may include determining multiple sub-kernels for the compute kernel, wherein a first sub-kernel includes, in the first dimension, a limited number of workgroups that is smaller than the first number of workgroups. The parser circuitry may iterate through workgroups in both the first and second dimensions to generate the set of workgroups, proceeding through the first sub-kernel before iterating through any of the other sub-kernels. Disclosed techniques may provide desirable shapes for batches of workgroups.

18 Claims, 12 Drawing Sheets

(56) References Cited

U.S. PATENT DOCUMENTS

| | | |
|---|---|---|
| 2009/0251476 A1 | 10/2009 | Jiao et al. |
| 2010/0257373 A1* | 10/2010 | Motoyama ............ G06F 21/755 |
| | | 713/189 |
| 2011/0314444 A1 | 12/2011 | Zhang et al. |
| 2012/0092353 A1 | 4/2012 | Paltashev et al. |
| 2013/0002689 A1 | 1/2013 | Panneer et al. |
| 2013/0024667 A1* | 1/2013 | Kyo ...................... G06F 9/3001 |
| | | 712/E9.017 |
| 2013/0141443 A1 | 6/2013 | Schmit et al. |
| 2013/0198494 A1 | 8/2013 | Grover et al. |
| 2013/0339978 A1 | 12/2013 | Sander |
| 2015/0015571 A1* | 1/2015 | Yuda .................... G06T 15/005 |
| | | 345/419 |
| 2015/0035841 A1 | 2/2015 | Havlir et al. |
| 2015/0091913 A1* | 4/2015 | Sathe ........................ G06T 1/60 |
| | | 345/506 |
| 2015/0269065 A1 | 9/2015 | Bourd et al. |
| 2016/0148335 A1 | 5/2016 | Huang et al. |
| 2016/0179490 A1 | 6/2016 | Lee |
| 2016/0247310 A1 | 8/2016 | Hui |
| 2017/0090658 A1* | 3/2017 | Park .................... G06F 3/04166 |
| 2017/0195147 A1* | 7/2017 | Sarrigeorgidis ......... H04B 1/30 |
| 2017/0263040 A1 | 9/2017 | Surazhsky et al. |
| 2019/0259129 A1 | 8/2019 | Rao et al. |
| 2021/0334933 A1* | 10/2021 | Strauss .................... G06T 1/60 |

OTHER PUBLICATIONS

Kim et al., "Design of a Fully Programmable Shader Processor for Low Power Mobile Devices," TENCON 2009 IEEE, 5 pages.

International Search Report and Written Opinion in PCT Appl. No. PCT/US2021/049554 dated Dec. 8, 2021, 15 pages.

Pandit et al., "Fluidic Kernels: Cooperative Execution of OpenCL Programs on Multiple Heterogeneous Devices," Proceedings of Annual IEEE/ACM International Symposium on Code Generation and Optimization, Feb. 15, 2014, pp. 273-283.

Abali et al., "Operating System Support for Fast Hardware Compression of Main Memory Contents," 27th Ann. Int. Sym. On Computer Architecutre, Jun. 11, 2000, 14 pages.

Lupescu et al., "Analysis of thread workgroup broadcast for Intel GPUs," Conference Paper—Jul. 2016, DOI: 10.1109/HPCSim.2016. 7568449, 7 pages.

* cited by examiner

Determine, for distribution to graphics processor circuitry, a set of workgroups from a compute kernel, where the compute kernel includes workgroups organized in multiple dimensions, including a first number of workgroups in a first dimension and a second number of workgroups in a second dimension
910

Determine multiple sub-kernels for the compute kernel, where a first sub-kernel includes, in the first dimension, a limited number of workgroups that is smaller than the first number of workgroups
920

Iterate through workgroups in both the first and second dimensions to generate the set of workgroups, where iteration through the workgroups proceeds through the first sub-kernel before iterating through any of the other sub-kernels
930

Indicate the workgroups in the set of workgroups for execution by the graphics processing circuitry
940

COMPUTE KERNEL PARSING WITH LIMITS IN ONE OR MORE DIMENSIONS WITH ITERATING THROUGH WORKGROUPS IN THE ONE OR MORE DIMENSIONS FOR EXECUTION

BACKGROUND

Technical Field

This disclosure relates generally to graphics processors and more specifically to techniques for dispatching compute work from a compute stream.

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Compute work is often specified as kernels that are multi-dimensional aggregations of compute workgroups. For a three-dimensional kernel, for example, the kernel may have a number of workgroups in each of the x, y, and z dimensions. It may be advantageous from a performance standpoint to parse and dispatch batches of multiple workgroups per cycle from a kernel for execution by shader hardware.

BRIEF DESCRIPTION OF THE DRAWINGS

FIG. 9 is a flow diagram illustrating an example method for generating batches of workgroups from a compute kernel using sub-kernel techniques, according to some embodiments.

DETAILED DESCRIPTION

Figure 1A:
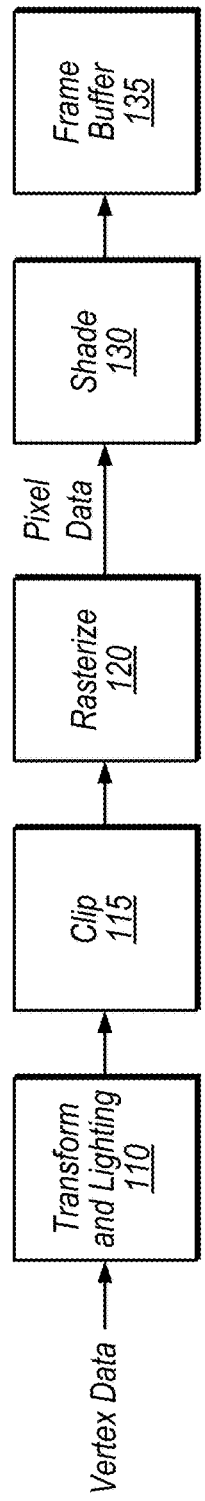
FIG. 1A is a block diagram illustrating an example graphics processing flow.
Figure 1B:
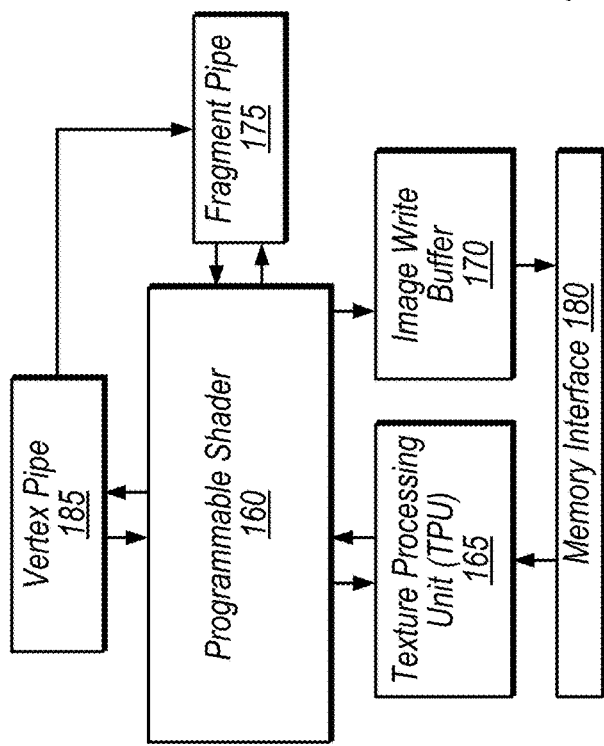
FIG. 1B is a block diagram illustrating one embodiment of a graphics unit.
Figure 2:
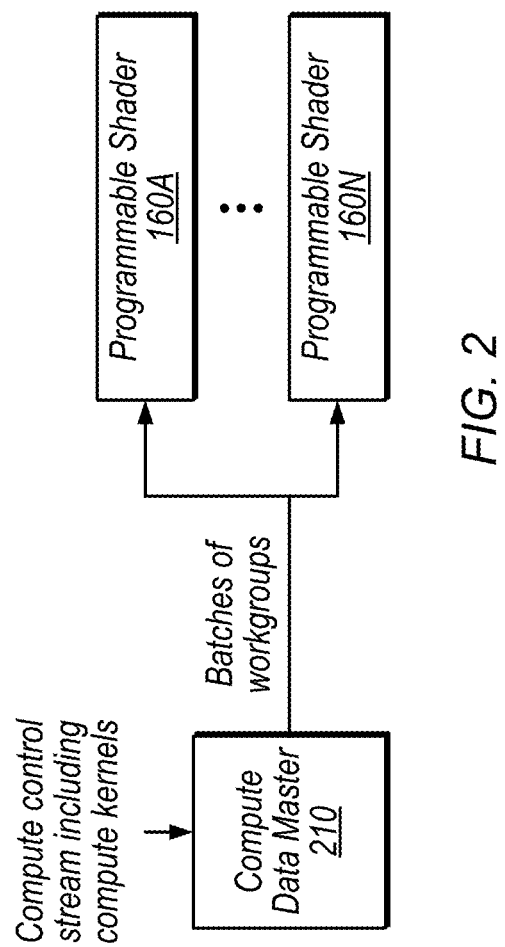
FIG. 2 is a block diagram illustrating an example compute data master configured to select batches of workgroups for processing by shader circuitry, according to some embodiments.
Figure 3:
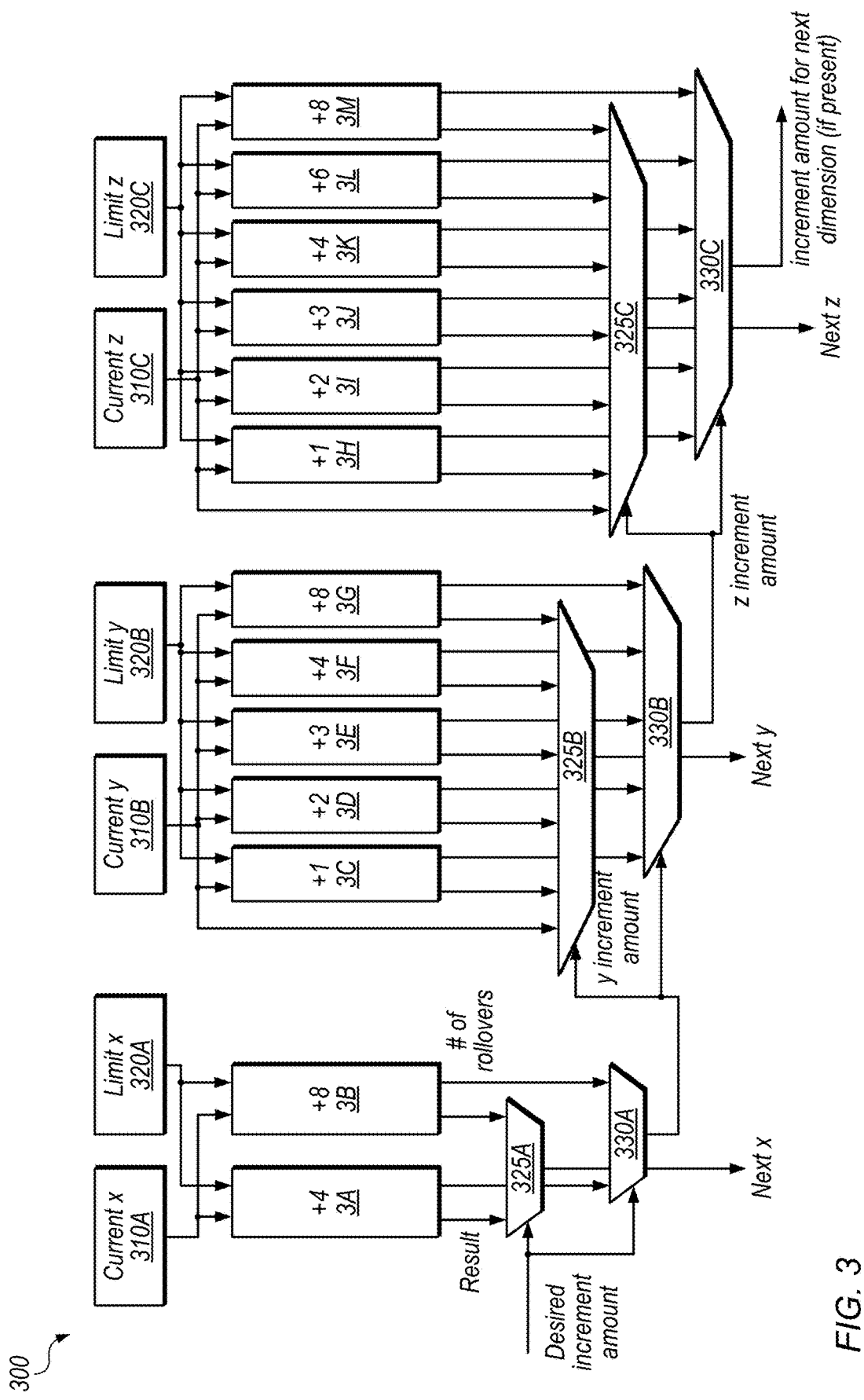
FIG. 3 is a block diagram illustrating example parallel circuitry for determining increment amounts in multiple dimensions, according to some embodiments.
Figure 4:
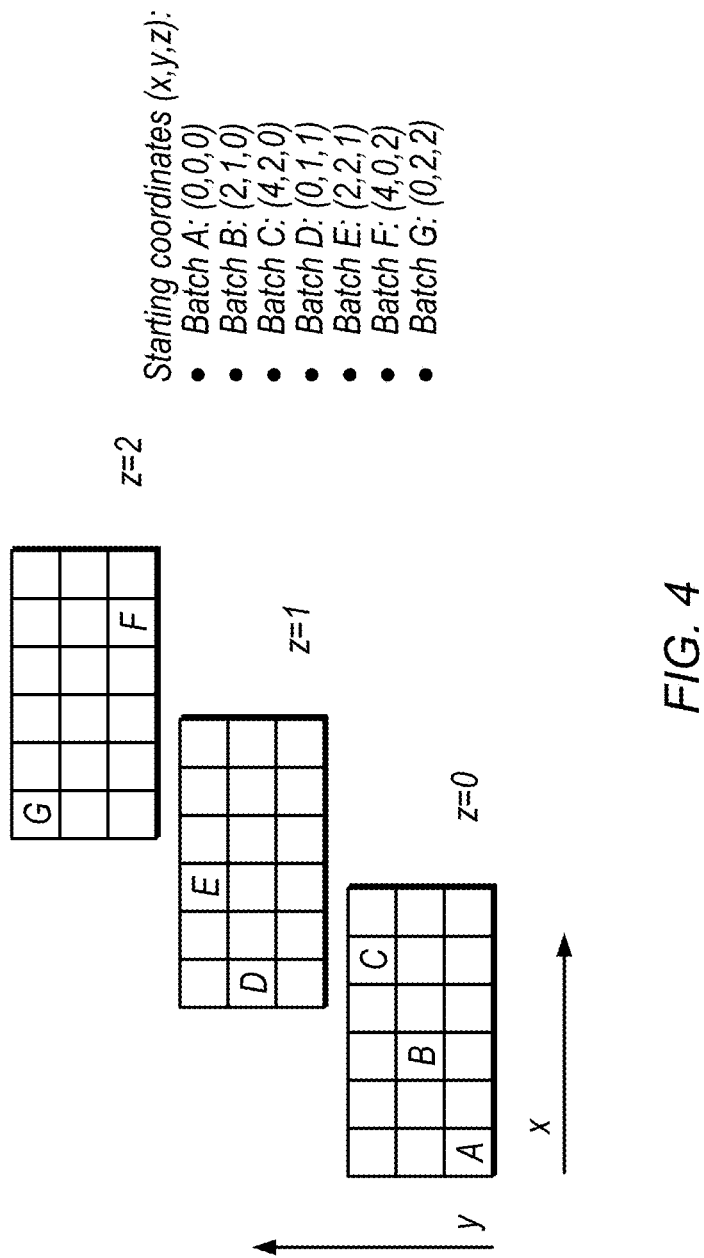
FIG. 4 is a diagram illustrating selection of batches from an example three-dimensional kernel, according to some embodiments.
Figure 5:
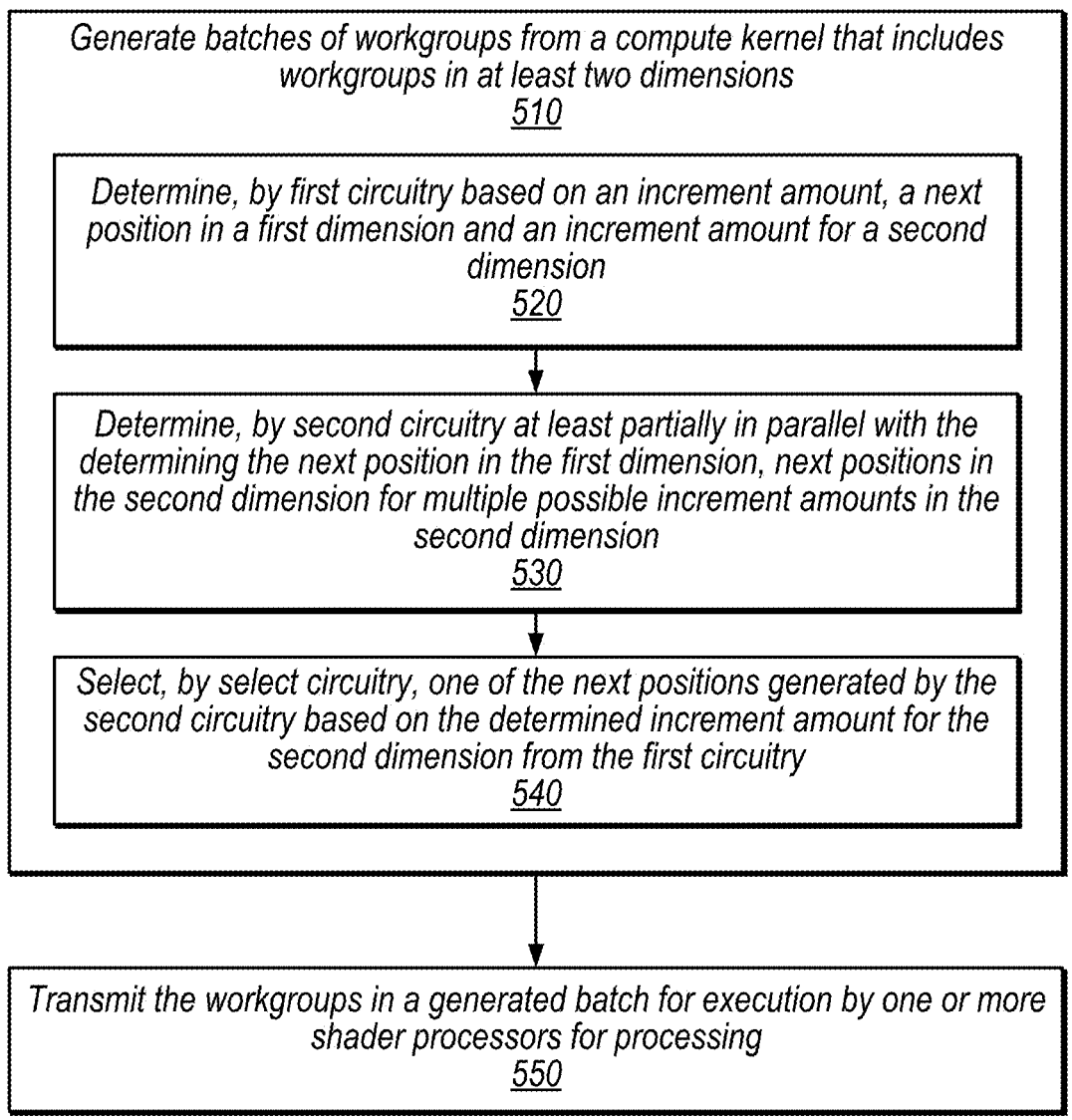
FIG. 5 is a flow diagram illustrating an example method for generating batches of compute workgroups, according to some embodiments.

The first portion of this disclosure describes techniques for rapidly determining increments in multiple dimensions for a next batch of compute workgroups. FIGS. 1A-1B provide a generalized overview of a graphics processing flow and an example graphics unit. FIG. 2 illustrates an example compute data master that may include circuitry configured to determine offsets in multiple dimensions for a batch of compute workgroups, e.g., as shown in FIG. 3. FIG. 4 illustrates example batches for a three-dimensional kernel. FIG. 5 illustrates an example method for determining multiple dimensions for a batch of compute workgroups at least partially in parallel.

The next portion of this disclosure describes techniques for limiting traversal, when generating batches, in one or more dimensions. The inventors of the present disclosure have discovered that it may be advantageous to avoid certain shapes of batches in conjunction with other processing techniques. For example, in some embodiments output data generated by workgroups is compressed before storage. In these embodiments, arrangement of data for compute work in "long" rectangular parallelepipeds may reduce compression performance for certain algorithms. U.S. patent application Ser. No. 16/673,883, filed Nov. 4, 2019 is incorporated by reference herein in its entirety and discusses example techniques for compressing compute outputs. When a batch of workgroups is substantially longer in one dimension, compute compression circuitry may struggle to aggregate blocks of data for compression. Therefore, batches with more shapes that are closer to a certain desired shape for buffering (e.g., a cube) may be advantageous.

Figure 6:
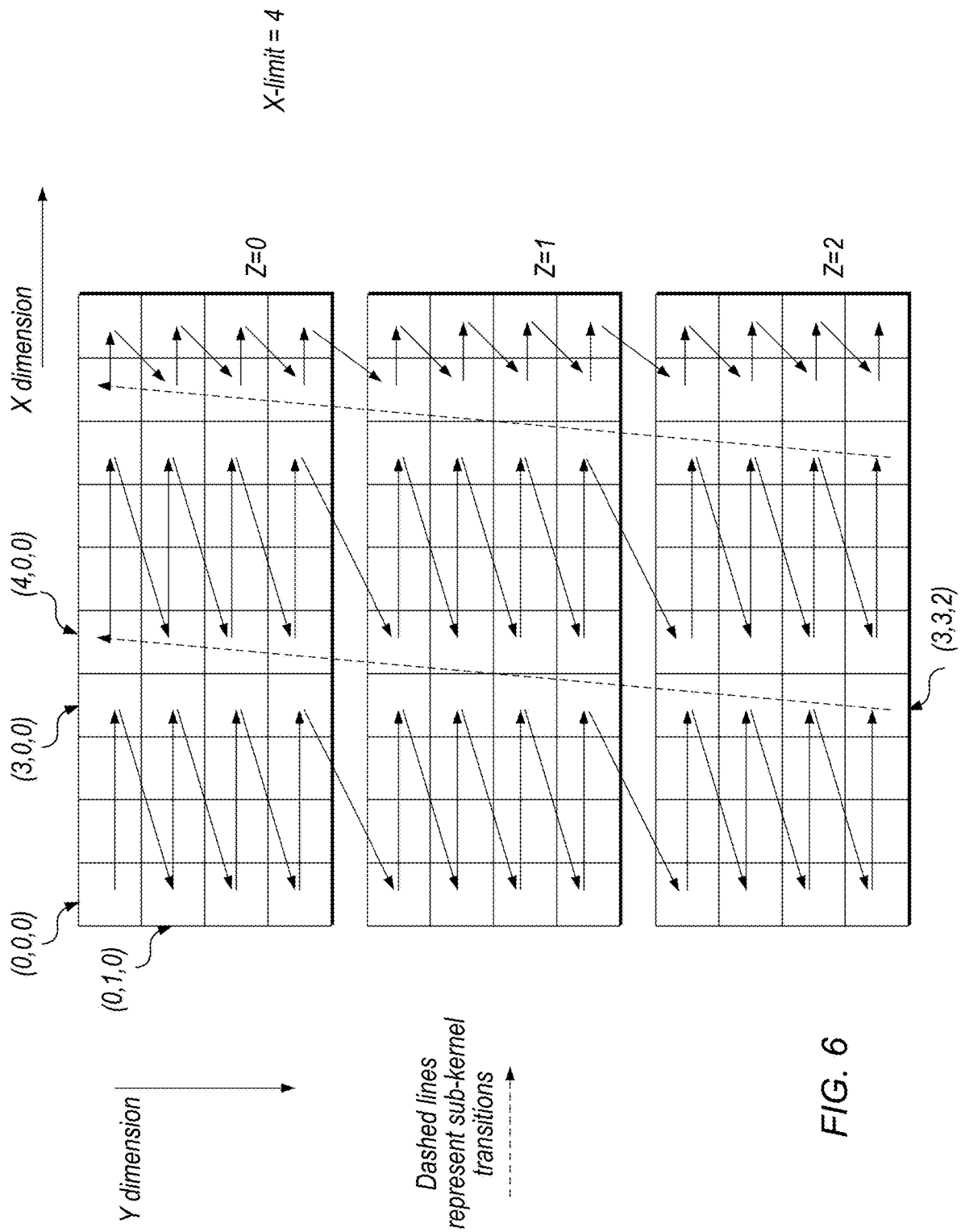
FIG. 6 is a diagram illustrating example batching with a limit in the X direction that defines sub-kernels, according to some embodiments.
Figure 7:
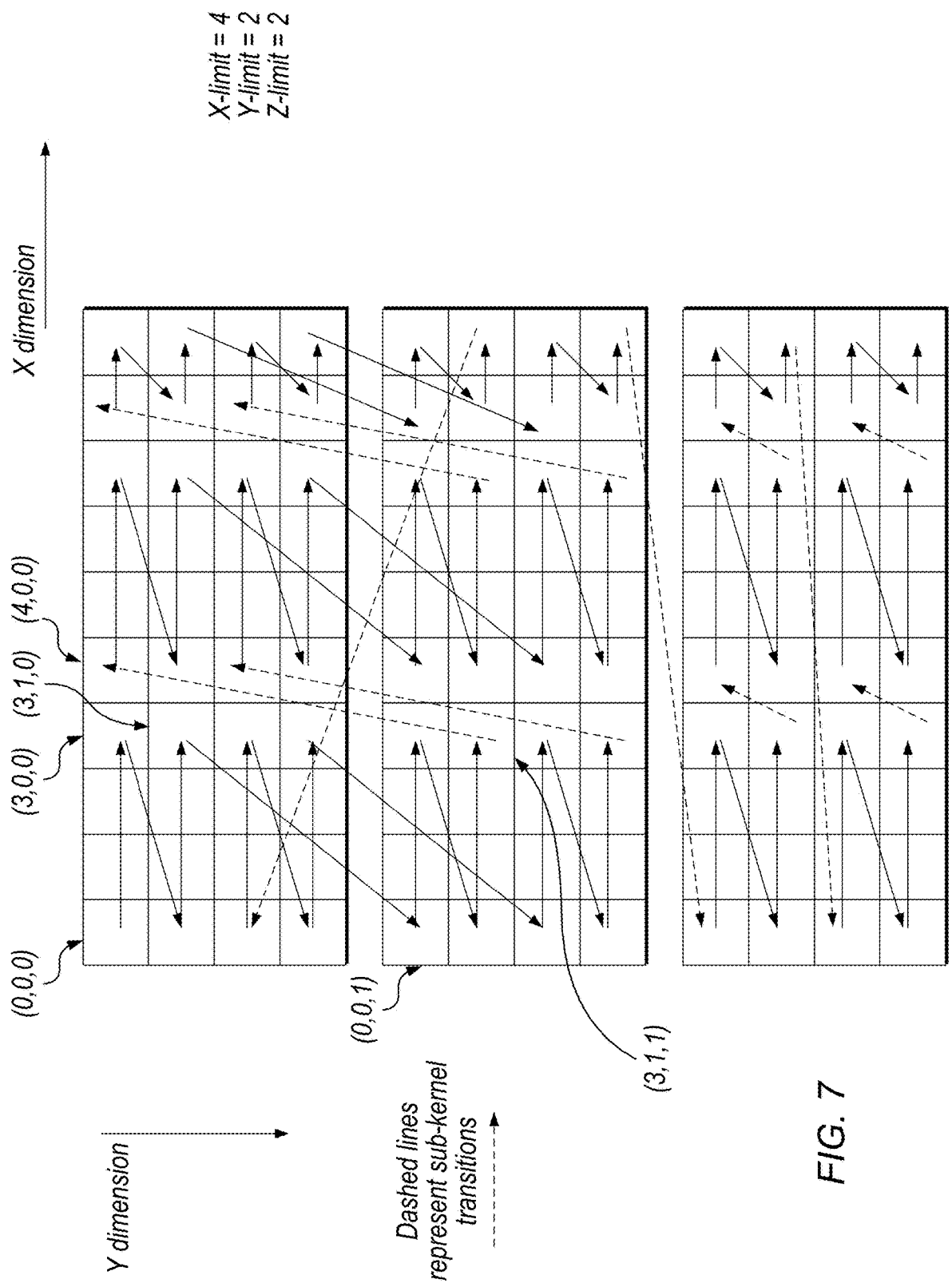
FIG. 7 is a diagram illustrating example batching with limits in three directions, according to some embodiments.
Figure 8:
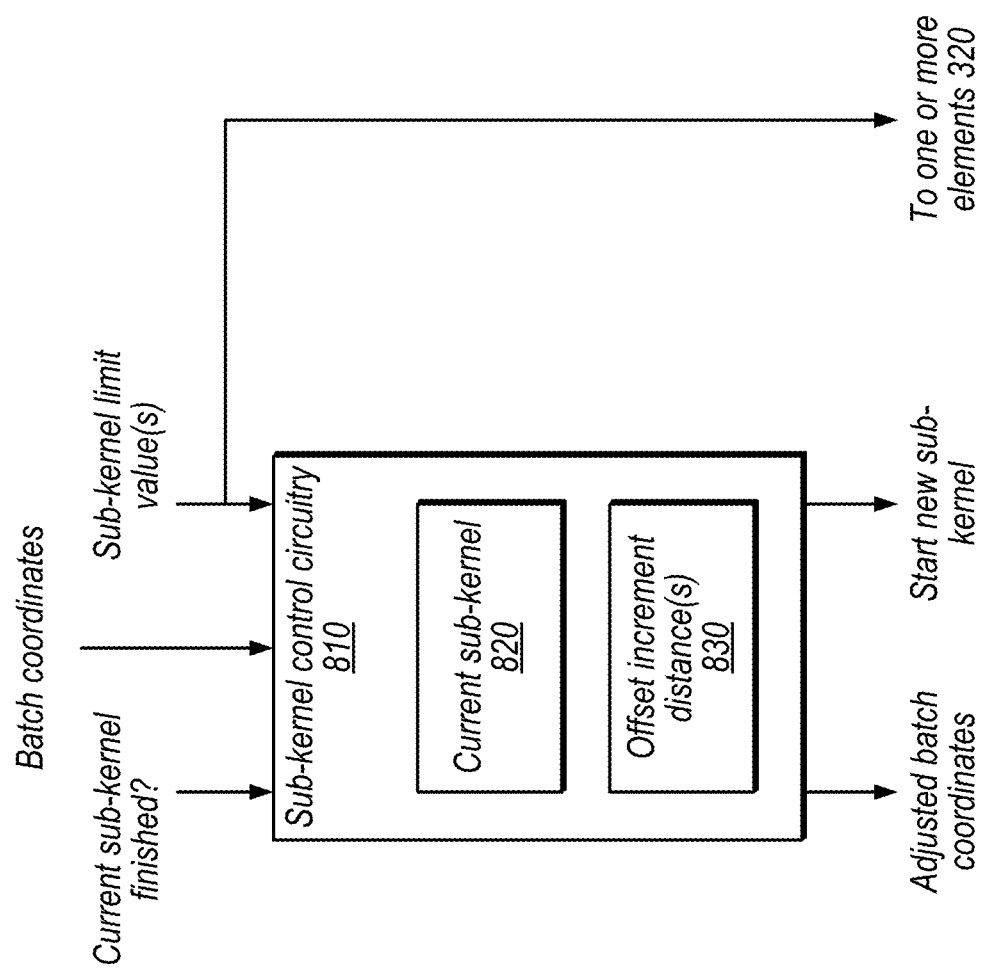
FIG. 8 is a block diagram illustrating example sub-kernel control circuitry configured to enforce limits in one or more dimensions, according to some embodiments.

FIG. 6 shows example batches generated using a limit in the X direction. FIG. 7 shows example batches generated using limits in three directions. FIG. 8 shows example sub-kernel control circuitry configured to impose such limits and FIG. 9 shows an associated method. In various embodiments, the disclosed techniques may advantageously improve performance of a graphics processor.

Figure 10:
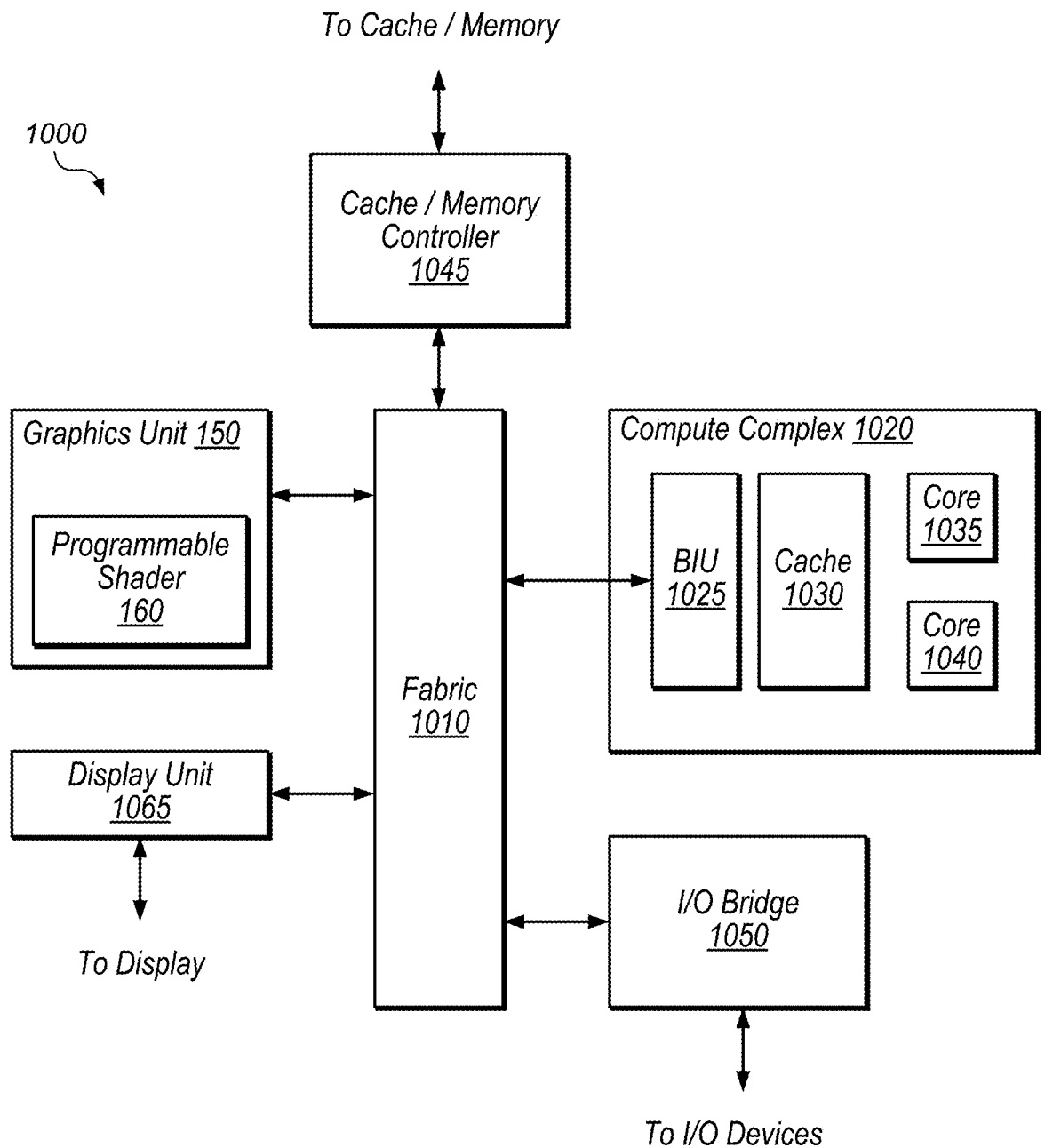
FIG. 10 is a block diagram illustrating one embodiment of a device that includes a graphics unit.
Figure 11:
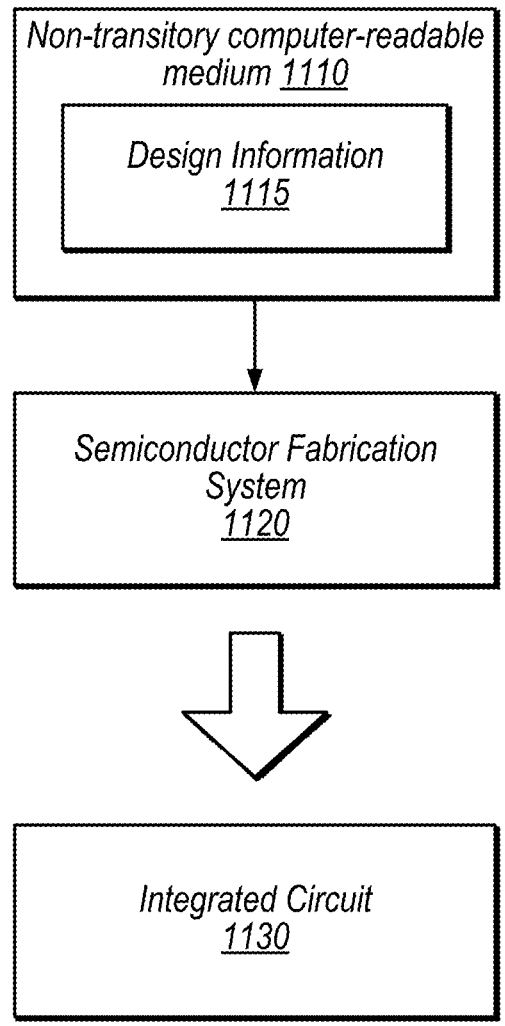
FIG. 11 is a block diagram illustrating an example computer-readable medium, according to some embodiments.
Figure 12:
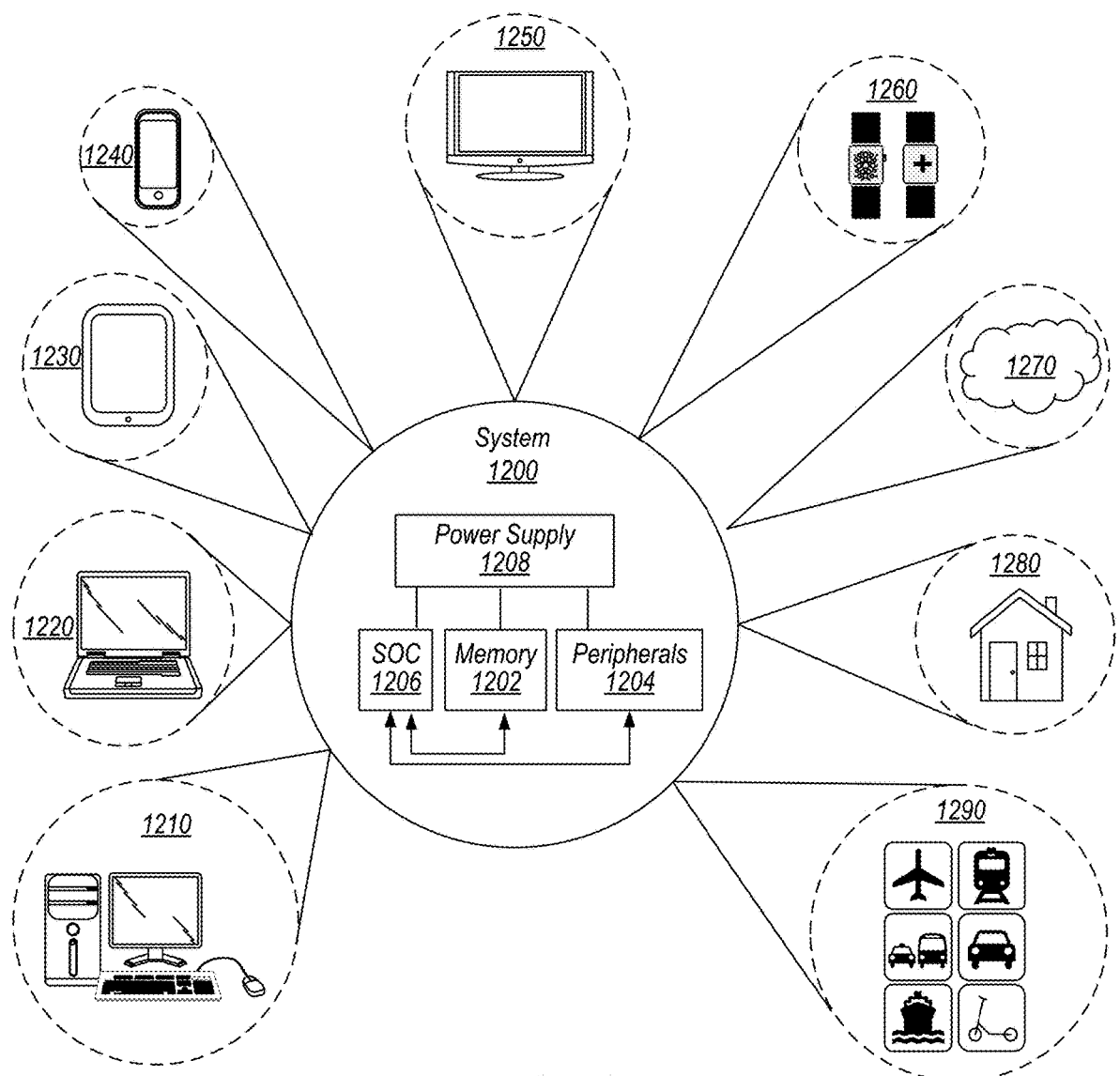
FIG. 12 is a block diagram illustrating an example system, according to some embodiments.

FIG. 10 illustrates an example device, FIG. 11 illustrates an example computer-readable medium and FIG. 12 illustrates an example system.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview and Examples of Compute Control Stream

FIG. 2 is a block diagram illustrating an example compute data master 210 configured to receive a compute control stream that includes compute kernels and distribute corresponding compute work to various graphics shaders in programmable shader 160 (or multiple programmable shaders 160A-160N), according to some embodiments. In some embodiments, arbitration circuitry (not explicitly shown) is configured to arbitrate between different data masters. For example, a pixel data master and a vertex data master may also send work to programmable shader 160 and the arbitration circuitry may assign resources to those data masters and to compute data master 210. In the illustrated embodiment, the compute control stream includes compute kernels, but it may also include other commands, e.g., for control flow.

In some embodiments, compute data master 210 is configured to send different workgroups to different shader circuitry, e.g., so that the shader circuitry can process the workgroups in parallel. In some embodiments, it may be desirable to dispatch multiple workgroups per clock cycle, e.g., to improve overall performance. In other embodiments, compute data master 210 may dispatch workgroups to other types of graphics elements (e.g., to distributed compute data master circuitry that is configured to send workgroups to shader hardware).

FIG. 3 is a block diagram illustrating example circuitry 300 configured to generate workgroup coordinates for batches of workgroups, according to some embodiments. In some embodiments, circuitry 300 is included in compute data master 210. In the illustrated embodiment, circuitry 300 is configured to generate coordinates for a next batch in three dimensions: x, y, and z. In other embodiments, fewer dimensions (e.g., two) or a greater number of dimensions (four or more) may be implemented using similar techniques. The disclosed dimensions are included for purposes of illustration but are not intended to limit the scope of the present disclosure.

Circuitry 310A-310C, in the illustrated embodiment, stores the current coordinate in the x, y, and z dimensions respectively. The current coordinate indicates where compute data master 210 should begin selecting workgroups for the current batch, in some embodiments.

Registers 320A-320C, in the illustrated embodiment, store the limit for each of the dimensions based on the size of the kernel. For example, for a kernel that has three workgroups in the x direction, four in the y direction, and five in the z direction, registers 320 store corresponding values, in some embodiments (e.g., 2, 3, and 4 in embodiments that start counting at zero). In some embodiments, the limit value is used to determine when to rollover when incrementing a particular coordinate.

Increment circuit blocks 3A and 3B, in the illustrated embodiment, are configured to increase the current value of x by +4 and +8 respectively. In other embodiments, any of various increment amounts may be implemented and selectable using the desired increment amount input to multiplexer (MUX) 325A. In some embodiments, the desired increment amount corresponds to the number of workgroups per batch. Note that if the increase results in a position greater than the limit indicated by register 320, the value may rollover one or more times. For example, if the current x is 2, the limit for x is 6, and +8 is selected, the next x coordinate would be 3, with one rollover. If the current x is 0, the limit is 1 and +4 is selected, the next x coordinate would be 0 with two rollovers. In the illustrated embodiment, the circuitry 3A and 3B is configured to output the next x value based on the selected increase and also indicate the number of rollovers. The proper next position and number of rollovers is selected by MUXes 325A and 330A. In the illustrated embodiment, the selected number of rollovers indicates the y increment amount for the current batch, which is then used to select from the inputs of MUXes 325B and 330B.

As shown, in some embodiments, the next position in the y dimension is determined at least partially in parallel with determination of the next position in the x dimension. For example, increment circuit blocks 3C-3G, in the illustrated embodiment, are configured to determine next y and rollover values for multiple different y increment amounts (+1, +2, +3, +4, and +8, in the illustrated example) corresponding to different potential y increment amounts (e.g., numbers of rollovers in the x dimension). MUXes 325B and 330B are then configured to output the selected next y and a z increment amount based on the y increment amount from MUX 330A, as shown. Thus, in various embodiments, circuitry 3C-3G is configured to operate at least partially in parallel with circuitry 3A and 3B. This circuit design may reduce the overall time needed to determine all coordinates for a batch, in various embodiments, which may advantageously improve GPU performance (e.g., by increasing the number of workgroups processed per cycle). In various embodiments, the disclosed techniques may facilitate dispatching batches of workgroups with multiple workgroups in multiple dimensions (e.g., multiple workgroups in the x dimension and multiple workgroups in the y dimension) in a single cycle (although other batches may include multiple workgroups in only the x dimension, for example). Generally, the number of dimensions included in a given batch may depend on the batch size and dimensions of the kernel, for example. The disclosed techniques may also facilitate implementation of an adjustable number of workgroups per batch.

In the illustrated embodiment, circuit blocks 3H-3M are similarly configured to generate next positions in the z dimension based on the current z and z limit at least partially in parallel with the operations of circuit blocks 3A-3G and MUXes 325C and 330C are configured to select their appropriate input based on the z increment amount (corresponding to the number of rollovers in the y dimension). In the illustrated embodiment, the increment amount for the next dimension is output from MUX 330C. In embodiments in which Z is the last dimension, MUX 330 may be omitted and circuit blocks 3H-3M may not output a number of rollovers. Similar techniques may be used for any number of additional dimensions.

In some embodiments, power control circuitry (not explicitly shown) may be configured to control power to at least a portion of the circuit blocks 3A-3M based on one or more limit values. For example, if the limit for the x dimension is eight and +8 is the largest available increment value, then x can rollover at most once per batch and circuit blocks 3D-3G and 3I-3M may be placed in a low power state (e.g., power gated). In the illustrated embodiment, one or more of circuit blocks 3I-3M may also be power gated based on the limit in the y dimension. These power control techniques may reduce power consumption without reducing performance.

In various embodiments, the last batch from a kernel may include a smaller number of workgroups. For example, if the configured number of workgroups per batch is eight, but the kernel only has three workgroups left, the last batch would include only three workgroups. In some embodiments, circuitry is configured to determine the number of workgroups in the last batch to properly dispatch these workgroups. In some embodiments, the graphics unit is configured to detect the last batch by detecting an overflow in the last dimension, e.g., a next z greater than the limit z 320C in the embodiment of FIG. 3.

In some embodiments, the graphics unit determines the number of workgroups in the last batch for a three-dimensional kernel as wg_left_in_x_dim+ (wg_in_x*num_rows_left_in_y_dim)+ (wg_in_x*wg_in_y*num_planes_left_m_z_dim). The graphics unit may determine the number of elements (e.g., workgroups (wg), rows, planes, etc.) left in a particular dimension as the limit value in that dimension minus the current position in that dimension, for example. The wg_in_dimension value may correspond to the limit value. In some embodiments, this determination for the last workgroup may be performed using a greater number of cycles than other workgroups (e.g., multiple cycles where the other workgroup coordinates are determined in a single cycle). Because this calculation takes place at the end of the kernel, however, this may not substantially affect performance.

FIG. 4 is a diagram illustrating example coordinates for batches of workgroups from a three-dimensional compute kernel. In the illustrated embodiment, the kernel includes six workgroups in the x dimension, three workgroups in the y dimension, and three workgroups in the z dimension. Thus, the x coordinate can range from 0 to 5 with a limit value of 5 while the y and z coordinates can range from 0 to 2 with a limit value of 2, for this example.

In the illustrated example, circuitry 300 generates batches with eight workgroups in each batch. In various embodiments, the number of workgroups per batch may vary or may be configurable. For the first batch, the initial coordinates are (0,0,0) in the illustrated example (using the format (x,y,z)).

In the illustrated example, the next x coordinate is two (with one rollover), the next y coordinate is one (selected based on the rollover in the x-dimension), and the next z coordinate remains zero for batch B. The coordinates are similarly updated for batch C and so on. Note that for batch D, the z coordinate is one based on a rollover in the y dimension. Although there are no batches with multiple roll-overs in a given dimension, this situation could occur for kernels of different sizes and/or a larger number of workgroups per batch.

FIG. 5 is a flow diagram illustrating an example method 500 for generating multi-dimensional batches of workgroups from a compute kernel, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, workgroup batch circuitry (e.g., circuitry 300) generates batches of workgroups from a compute kernel. In the illustrated embodiment, the compute kernel is a structure that includes workgroups in at least two dimensions, e.g., an x dimension and a y dimension (although the kernel structure may include additional dimensions in various embodiments). In the illustrated embodiment, this includes performing method elements 520-540.

At 520, in the illustrated embodiment, first circuitry (e.g., element 3A or 3B of FIG. 3) determines, based on an increment amount, a next position in a first dimension and an increment amount for a second dimension. The increment amount for the second dimension may correspond to a number of rollovers in the first dimension. The increment amount may be fixed in a given design or may be programmable (and thus may vary among different kernels and/or within a kernel). A programmable increment amount may facilitate efficient scheduling, e.g., by adjusting the granularity at which compute kernels send batches for execution when other graphics work is using relatively larger or smaller amounts of execution resources.

At 530, in the illustrated embodiment, second circuitry (e.g., elements 3C-3G of FIG. 3) determines, at least partially in parallel with the determination of the next position in the first dimension, next positions in the second dimension for multiple possible increment amounts in the second dimension. Determining multiple next positions may increase performance by performing at least a portion of the calculations before the first circuitry has determined the actual increment amount in the second dimension.

At 540, in the illustrated embodiment, select circuitry (e.g., MUX 325B) selects one of the next positions generated by the second circuitry based on the determined increment amount for the second dimension from the first circuitry.

At 550, in the illustrated embodiment, the graphics unit transmits the workgroups in a generated batch for execution by one or more shader processors for processing. In some embodiments, ones of the workgroups may be sent for execution by different portions of the one or more shader processors. The transmission of workgroups may be performed directly to the shader hardware or to another graphics block (e.g., distributed compute data master circuitry that is configured, in turn, to send workgroups to shader processors). In some embodiments, the elements of FIG. 5 are performed in a single clock cycle. Thus, in these embodiments multiple workgroups may be dispatched per cycle.

In some embodiments, additional circuitry is configured to determine next positions for one or more additional dimensions at least partially in parallel with the first and second circuitry. In some embodiments, the graphics unit converts a specified number of workitems for the compute kernel into a number of workgroups. In some embodiments, the graphics unit generates a batch that includes multiple workgroups in each of the first and second dimensions in a single clock cycle.

Example Batching Using Limits to Define Sub-Kernels

As discussed in the introductory portion of this disclosure, in some embodiments kernel parser circuitry is configured to impose limits on iteration in one or more dimensions when generating batches, which may effectively divide a kernel into one or more sub-kernels. Batching circuitry may iterate through one sub-kernel before proceeding to the next. This may result in desirable batch shapes which may in turn improve compression performance, reduce the size of buffering circuitry, or both.

FIG. 6 is a diagram illustrating example batching with a limit in the X direction that defines sub-kernels, according to some embodiments. In the illustrated example, the workgroup in the origin position (0,0,0) is represented by the upper left-hand square. The arrows represent the walk order when iterating through the kernel to generate batches.

In the illustrated example, there is a limit of four workgroups in the X direction. Therefore, after reaching workgroup (3,0,0), iteration proceeds to workgroup (0,1,0) instead of proceeding to (4,0,0). This limit defines a number of sub-kernels, where one sub-kernel is walked before proceeding to the next. In the illustrated example, the first sub-kernel ends at (3, 3, 2) and iteration proceeds to the next sub-kernel, which begins at (4,0,0) as shown using a dashed line.

If the batch size were 32 in this example, the first batch would be a 4×4×2 batch of workgroups. In contrast, if the limit in the X direction was not implemented, the first batch might be a 10×4×1 batch (with only two workgroups in the last row), which is longer in the X direction and further from being a cube shape the batch shaped generated using sub-kernels.

FIG. 7 is a diagram illustrating example batching with limits in three directions, according to some embodiments. In the illustrated example, there is a limit of four workgroups in the X direction, a limit of two workgroups in the Y direction, and a limit of two workgroups in the Z direction. As shown, iteration begins at the origin and reaches the X sub-kernel limit at (3,0,0). Iteration then reaches both the X and Y limits at (3,1,0) and proceeds to (0,0,1). At workgroup (3,1,1) iteration reaches all three limits and proceeds to the next sub-kernel, which begins at (4,0,0).

If the batch size were 16 in this example, the first batch (corresponding in size to the first sub-kernel in this example) would be a 4×2×2 batch of workgroups. In contrast, if the sub-kernel limits were not implemented, the first batch might be a 10×2×1 batch (with six workgroups in the second row).

In other embodiments, control circuitry may impose sub-kernel limits in any appropriate number of dimensions. Further, various limit values may be implemented to achieve various different desired multi-dimensional batch shapes.

Example Control Circuitry

FIG. 8 is a block diagram illustrating example sub-kernel control circuitry configured to enforce limits in one or more dimensions, according to some embodiments. In the illustrated embodiment, sub-kernel control circuitry 810 maintains a current sub-kernel 820 and one or more offset increment distances 830. Sub-kernel control circuitry 810 receives a signal indicating whether the current sub-kernel is finished, batch coordinates (e.g., generated by circuitry 300), and one or more sub-kernel limit values. Sub-kernel control circuitry 810 then generates a start new sub-kernel command (e.g., for circuitry 300) and adjusted batch coordinates.

The batch coordinates indicate the next X, next Y, and next Z, e.g., as generated by circuitry 300. The sub-kernel limit value(s) correspond to the size of sub-kernels in one or more dimensions. In the example of FIG. 7, the limit value for X was four, the limit value for Y was two and the limit value for Z was two. In the illustrated example, in addition to being provided to sub-kernel control circuitry 810, these limits are provided to one or more of elements 320 of FIG. 3 (in some embodiments, control circuitry 810 may provide elements 320 with a smaller value than the sub-kernel limit value, e.g., when there are less workgroups left in the kernel in a particular dimension than the sub-kernel limit value). This may allow circuitry 300 to stop at the appropriate edges of a sub-kernel based on the limit values. Circuitry 300 may then be controlled by circuitry 810 to start the next sub-kernel.

In the illustrated embodiment, sub-kernel control circuitry 810 determines offsets in one or more dimensions for each kernel. For example, for an X-direction limit of four, the first sub-kernel may start at X=0, the second at X=4, the third at X=8, and so on. When the end of a sub-kernel is reached, sub-kernel control circuitry 810 may appropriately add the current offset to the outputs of circuitry 300 of FIG. 3 to accurately reflect the batch coordinates. The adjusted batch coordinates may be transmitted to other circuitry in order to properly process the batch. For example, compute data master 210 may send the batches to shader processors (or in some embodiments, to distributed workload parser circuitry that may in turn send workitems to shader processors).

Sub-kernel control circuitry 810 may then reset circuitry 300 to start at (0,0,0) for the next sub-kernel. This may allow circuitry 300 to operate as described above with reference to FIG. 3 without any knowledge that a kernel has been split into sub-kernels.

Sub-kernel control circuitry 810 may determine current offsets as the current sub-kernel position multiplied by the offset increment distance(s) (which correspond to the sub-kernel limit values in one or more dimensions). Sub-kernel control circuitry 810 may increment a value of the current sub-kernel each time a new sub-kernel is started.

In some embodiments, the compute kernel itself indicates one or more limit values to be used in its processing. In some embodiments, the limits are encoded as a number of workitems (e.g., compute threads). For example, a kernel limit field may be an N-bit field whose possible values denote different supported limits on the number of workitems in a dimension. In some embodiments, the processor converts these workitem limits into workgroup limits, e.g., by dividing the workitem limit by the number of workitems in each workgroup for the kernel. In some embodiments, the processor may determine the limit values internally, without software control, in one or more modes or situations.

Although the detailed embodiments disclosed herein generate batches of workgroups based on limits in one or more dimensions, other embodiments may impose limits at other granularities. The disclosed examples are intended for purposes of explanation, but are not intended to limit the scope of the present embodiment.

Example Method

FIG. 9 is a flow diagram illustrating an example method for generating batches of workgroups from a compute kernel using sub-kernel techniques, according to some embodiments. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, workload parser circuitry determines, for distribution to graphics processor circuitry, a set of workgroups (also referred to herein as a batch) from a compute kernel, where the compute kernel includes workgroups organized in multiple dimensions, including a first number of workgroups in a first dimension and a second number of workgroups in a second dimension. In the illustrated embodiment, this determination includes elements 920 and 930.

At 920, in the illustrated embodiment, the workload parser circuitry determines multiple sub-kernels for the compute kernel, where a first sub-kernel includes, in the first dimension, a limited number of workgroups that is smaller than the first number of workgroups. The determination of the sub-kernels may include accessing sub-kernel limits in one or more dimensions.

In some embodiments, the workload parser circuitry determines the limited number of workgroups in the first dimension by accessing information from a compute command stream that includes the compute kernel. For example, metadata field(s) for the kernel may indicate limit(s) in one or more dimensions for generating batches from the kernel. In some embodiments, a compiler generates the limit(s). In some embodiments, the information specifies a number of workitems in the first dimension to iterate before moving in the second dimension. In these embodiments, the processor may determine the limited number of workgroups based on the specified number of workitems.

The workload parser circuitry may determine limits in multiple dimensions. For example, the first sub-kernel may include a limited number of workgroups in the second dimension that is smaller than the second number of workgroups. Further, the compute kernel may include a third number of workgroups in a third dimension and the first sub-kernel may include a limited number of workgroups in the third dimension that is smaller than the third number of workgroups.

At 930, in the illustrated embodiment, the workload parser circuitry iterates through workgroups in both the first and second dimensions (and potentially additional dimensions) to generate the set of workgroups, where iteration through the workgroups proceeds through the first sub-kernel before iterating through any of the other sub-kernel s.

At 940, in the illustrated embodiment, the workload parser circuitry indicates the workgroups in the set of workgroups for execution by the graphics processing circuitry. This may include transmitting coordinates for the set of workgroups, for example. In some embodiments the processor determines different offset values in the first dimension at which to begin different ones of the multiple sub-kernels. Therefore, processor may generate the coordinates by adding current sub-kernel offset(s) to coordinates generated by circuitry 300, for example.

In some embodiments, compression circuitry is configured to compress one or more blocks of output data generated by executing workgroups of the first sub-kernel (and potentially subsequent sub-kernels). In some embodiments, the disclosed techniques may improve compression performance, reduce buffer sizes used for compression, or both.

In some embodiments, the workload parser circuitry is configured to determine next coordinates for multiple dimensions at least partially in parallel, e.g., as shown in FIG. 3. For example, the workload parser circuitry may include first circuitry configured to determine, based on an increment amount and the limited number of workgroups in the first dimension, a next position in a first dimension and an increment amount for a second dimension, second circuitry configured to determine, at least partially in parallel with the determination of the next position in the first dimension, next positions in the second dimension for multiple possible increment amounts in the second dimension, and select circuitry configured to select one of the next positions generated by the second circuitry based on the determined increment amount for the second dimension from the first circuitry. In some embodiments, the workload parser circuitry is configured to determine the set of workgroups in a single clock cycle.

Example Device

Referring now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 150, and display unit 1065. In some embodiments, device 1000 may include other components (not shown) in addition to and/or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and/or caches. For example, compute complex 1020 may include 1, 2, or 4 processor cores, or any other suitable number. In one embodiment, cache 1030 is a set associative L2 cache. In some embodiments, cores 1035 and/or 1040 may include internal instruction and/or data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

Cache/memory controller 1045 may be configured to manage transfer of data between fabric 1010 and one or more caches and/or memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 150 may be described as "coupled to" a memory through fabric 1010 and cache/memory controller 1045. In contrast, in the illustrated embodiment of FIG. 10, graphics unit 150 is "directly coupled" to fabric 1010 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display, which may be included in the device or may be a separate device. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the circuitry discussed herein. In other embodiments, the disclosed circuitry may be implemented in other types of processors, such as CPUs, for example.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and/or low-power always-on functionality, for example. I/O bridge 1050 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1000 via I/O bridge 1050.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 11 is a block diagram illustrating an example non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis and/or layout of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIGS. 1B, 2, 3, and 8. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

FIG. 12 is a block diagram illustrating a system 1200 that may incorporate and/or otherwise utilize the methods and mechanisms described herein. In the illustrated embodiment, the system 1200 includes at least one instance of a system on chip (SoC) 1206 which may include multiple types of processing units, such as a central processing unit (CPU), a graphics processing unit (GPU), or otherwise, a communication fabric, and interfaces to memories and input/output devices. In some embodiments, one or more processors in SoC 1206 includes multiple execution lanes and an instruction issue queue similar to processor NNN (of FIG. N) and processor NNN (of FIG. N). In various embodiments, SoC 1206 is coupled to external memory 1202, peripherals 1204, and power supply 1208.

A power supply 1208 is also provided which supplies the supply voltages to SoC 1206 as well as one or more supply voltages to the memory 1202 and/or the peripherals 1204. In various embodiments, power supply 1208 represents a battery (e.g., a rechargeable battery in a smart phone, laptop or tablet computer, or other device). In some embodiments, more than one instance of SoC 1206 is included (and more than one external memory 1202 is included as well).

The memory 1202 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMS), dual inline memory modules (DIMMs), etc. Alternatively, the devices are mounted with a SoC or an integrated circuit in a chip-on-chip configuration, a package-on-package configuration, or a multi-chip module configuration.

The peripherals 1204 include any desired circuitry, depending on the type of system 1200. For example, in one embodiment, peripherals 1204 includes devices for various types of wireless communication, such as Wi-Fi, Bluetooth, cellular, global positioning system, etc. In some embodiments, the peripherals 1204 also include additional storage, including RAM storage, solid state storage, or disk storage. The peripherals 1204 include user interface devices such as a display screen, including touch display screens or multi-touch display screens, keyboard or other input devices, microphones, speakers, etc.

As illustrated, system 1200 is shown to have application in a wide range of areas. For example, system 1200 may be utilized as part of the chips, circuitry, components, etc., of a desktop computer 1210, laptop computer 1220, tablet computer 1230, cellular or mobile phone 1240, or television 1250 (or set-top box coupled to a television). Also illustrated is a smartwatch and health monitoring device 1260. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1200 may further be used as part of a cloud-based service(s) 1270. For example, the previously mentioned devices, and/or other devices, may access computing resources in the cloud (i.e., remotely located hardware and/or software resources). Still further, system 1200 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 12 is the application of system 1200 to various modes of transportation. For example, system 1200 may be used in the control and/or entertainment systems of aircraft, trains, buses, cars for hire, private automobiles, waterborne vessels from private boats to cruise liners, scooters (for rent or owned), and so on. In various cases, system 1200 may be used to provide automated guidance (e.g., self-driving vehicles), general systems control, and otherwise. These any many other embodiments are possible and are contemplated. It is noted that the devices and applications illustrated in FIG. 12 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise.

Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    graphics processor circuitry configured to execute instructions of compute kernels; and
    workload parser circuitry configured to:
        determine, for distribution to the graphics processor circuitry, a set of workgroups from a compute kernel that includes workgroups organized in multiple dimensions, including a first number of workgroups in a first dimension and a second number of workgroups in a second dimension, wherein the determination of the set of workgroups includes to:
            determine multiple sub-kernels for the compute kernel, wherein a first sub-kernel includes, in the first dimension, a limited number of workgroups that is smaller than the first number of workgroups;
            iterate through the workgroups in both the first and second dimensions to generate the set of workgroups, wherein iteration through the workgroups proceeds through the first sub-kernel before iterating through any other sub-kernels; and
            indicate the workgroups in the set of workgroups for execution by the graphics processor circuitry;
        wherein the workload parser circuitry includes:
            first circuitry configured to determine, based on an increment amount and the limited number of workgroups in the first dimension, a next position in the first dimension and an increment amount for the second dimension;
            second circuitry configured to determine, at least partially in parallel with the determination of the next position in the first dimension, next positions in the second dimension for multiple possible increment amounts in the second dimension; and
            select circuitry configured to select one of the next positions generated by the second circuitry based on the determined increment amount for the second dimension from the first circuitry; and
        wherein the graphics processor circuitry is configured to execute the workgroups in the set of workgroups in response to the indication of the workgroups for execution.

2. The apparatus of claim 1, further comprising:
    compression circuitry configured to compress a block of output data generated by executing workgroups of the first sub-kernel.

3. The apparatus of claim 1, wherein the workload parser circuitry is configured to determine the limited number of workgroups in the first dimension based on information in a compute command stream that includes the compute kernel.

4. The apparatus of claim 3, wherein the information specifies a number of workitems in the first dimension to iterate before moving in the second dimension, wherein the apparatus is configured to determine the limited number of workgroups based on the specified number of workitems.

5. The apparatus of claim 1, wherein the first sub-kernel includes a limited number of workgroups in the second dimension that is smaller than the second number of workgroups.

6. The apparatus of claim 5, wherein the compute kernel includes a third number of workgroups in a third dimension, wherein the first sub-kernel includes a limited number of workgroups in the third dimension that is smaller than the third number of workgroups.

7. The apparatus of claim 1, wherein the apparatus is configured to determine different offset values in the first dimension at which to begin different ones of the multiple sub-kernels.

8. The apparatus of claim 1, wherein the workload parser circuitry is configured to determine the set of workgroups in a single clock cycle.

9. The apparatus of claim 1, wherein the apparatus is a computing device that includes:
a graphics processor that includes the graphics processor circuitry and the workload parser circuitry;
a display;
a central processing unit; and
network interface circuitry.

10. A method, comprising:
determining, by workload parser circuitry for distribution to graphics processor circuitry, a set of workgroups from a compute kernel, wherein the compute kernel includes workgroups organized in multiple dimensions, including a first number of workgroups in a first dimension and a second number of workgroups in a second dimension, wherein the determining of the set of workgroups includes:
  determining multiple sub-kernels for the compute kernel, wherein a first sub-kernel includes, in the first dimension, a limited number of workgroups that is smaller than the first number of workgroups, including:
    determining, based on an increment amount and the limited number of workgroups in the first dimension, a next position in the first dimension and an increment amount for the second dimension;
    determining, at least partially in parallel with the determination of the next position in the first dimension, next positions in the second dimension for multiple possible increment amounts in the second dimension; and
    selecting one of the next positions in the second dimension based on the determined increment amount for the second dimension; and
  iterating through the workgroups in both the first and second dimensions to generate the set of workgroups, wherein iteration through the work groups proceeds through the first sub-kernel before iterating through any other sub-kernels;
indicating, by the workload parser circuitry, the workgroups in the set of workgroups for execution by the graphics processor circuitry; and
executing, by the graphics processor circuitry, the indicated workgroups.

11. The method of claim 10, further comprising:
compressing, by compression circuitry, a block of output data generated by executing workgroups of the first sub-kernel.

12. The method of claim 10, wherein the limited number of workgroups is based on information in a compute command stream that includes the compute kernel.

13. The method of claim 10, further comprising:
determining offset values in the first dimension at which to begin different ones of the multiple sub-kernels and adding the offset values to dimensions within the sub-kernels.

14. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
graphics processor circuitry configured to execute instructions of compute kernels; and
workload parser circuitry configured to:
  determine, for distribution to the graphics processor circuitry, a set of workgroups from a compute kernel that includes workgroups organized in multiple dimensions, including a first number of workgroups in a first dimension and a second number of workgroups in a second dimension, wherein the determination of the set of workgroups includes to:
    determine multiple sub-kernels for the compute kernel, wherein a first sub-kernel includes, in the first dimension, a limited number of workgroups that is smaller than the first number of workgroups;
    iterate through the workgroups in both the first and second dimensions to generate the set of workgroups, wherein iteration through the workgroups proceeds through the first sub-kernel before iterating through any other sub-kernels; and
  indicate the workgroups in the set of workgroups for execution by the graphics processor circuitry;
wherein the workload parser circuitry includes:
  first circuitry configured to determine, based on an increment amount and the limited number of workgroups in the first dimension, a next position in the first dimension and an increment amount for the second dimension;
  second circuitry configured to determine, at least partially in parallel with the determination of the next position in the first dimension, next positions in the second dimension for multiple possible increment amounts in the second dimension; and
  select circuitry configured to select one of the next positions generated by the second circuitry based on the determined increment amount for the second dimension from the first circuitry; and
wherein the graphics processor circuitry is configured to execute the workgroups in the set of workgroups in response to the indication of the workgroups for execution.

15. The non-transitory computer readable storage medium of claim 14, wherein the design information further specifies that the circuit includes:
compression circuitry configured to compress a block of output data generated by executing workgroups of the first sub-kernel.

16. The non-transitory computer readable storage medium of claim 14, wherein the workload parser circuitry is configured to determine the limited number of workgroups in the first dimension based on information in a compute command stream that includes the compute kernel.

17. The non-transitory computer readable storage medium of claim 14,
wherein the first sub-kernel includes a limited number of workgroups in the second dimension that is smaller than the second number of workgroups; and
wherein the compute kernel includes a third number of workgroups in a third dimension, wherein the first sub-kernel includes a limited number of workgroups in the third dimension that is smaller than the third number of workgroups.

18. The non-transitory computer readable storage medium of claim 14, wherein the workload parser circuitry is configured to determine the set of workgroups in a single clock cycle.

* * * * *